3,301,761
CONTAINMENT ARRANGEMENT FOR STEAM
GENERATING NUCLEAR REACTOR SYSTEMS
Frank Geoffrey Johnson, Altrincham, and Geoffrey Vincent Windle, Bolton, England, assignors to United Kingdom Atomic Energy Authority, London, England
Filed Mar. 3, 1964, Ser. No. 348,962
Claims priority, application Great Britain, Mar. 8, 1963, 9,272/63
2 Claims. (Cl. 176—37)

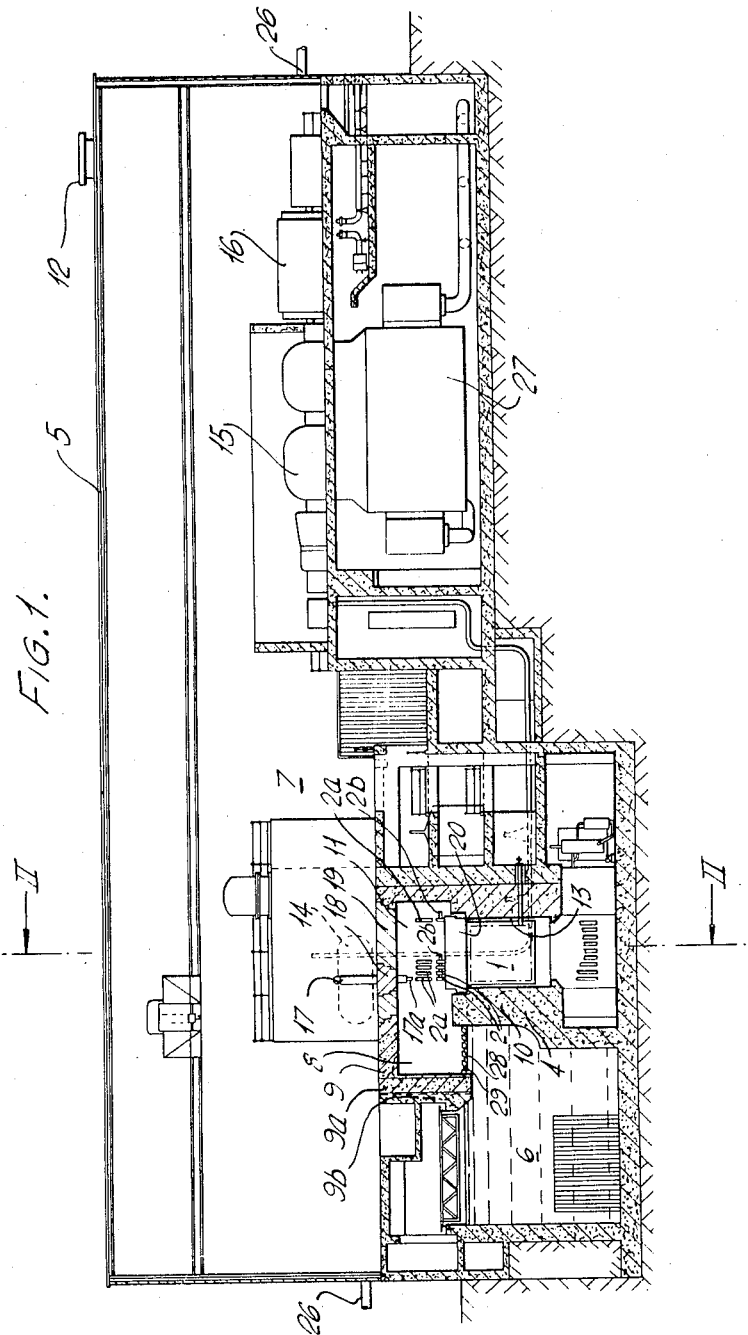

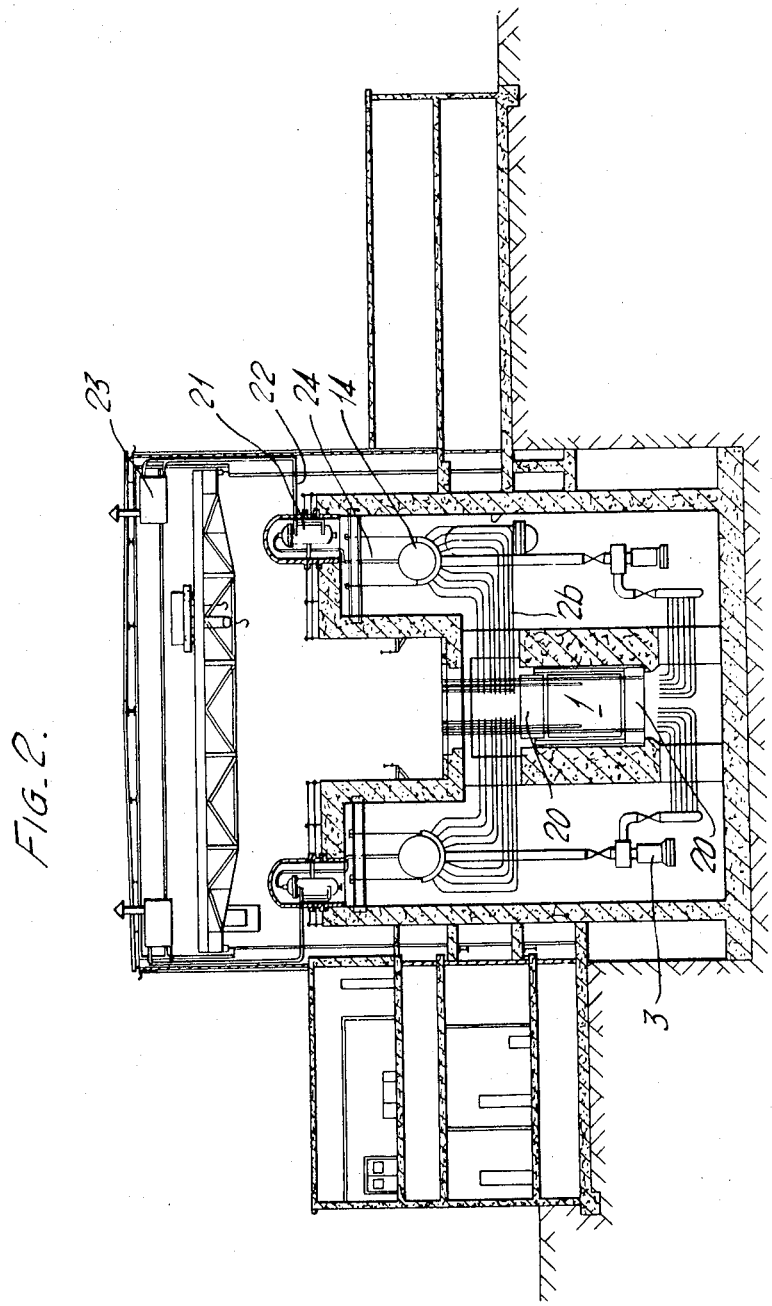

This invention relates to steam generating nuclear reactor systems of the kind wherein steam at pressure is generated in a nuclear reactor by heat transfer from nuclear fuel to water. Such a system is hereinafter referred to as of the kind described.

When designing systems of the kind described, consideration has to be given to safety provisions in the unlikely event of a breach of the reactor allowing escape of steam. An initial volume of relatively high pressure steam escaping from the reactor should not be seriously contaminated by radioactive products but as the nuclear fuel of the reactor loses its heat transfer medium overheating is likely to occur with subsequent release of radioactive contaminants. These contaminants are expected to be carried from the reactor with a second volume of relatively low pressure steam.

Generally according to the invention, a nuclear reactor system of the kind described has a first containment structure spaced from and enclosing the reactor, a second containment structure spaced from and enclosing the first containment structure, a pond of water disposed in the space between the first and second containment structures, means defining a venting duct extending from the first containment structure to below the surface of said pond and pressure-sensitive non-return relief means for venting the second containment structure to atmosphere.

The invention provides an arrangement whereby a large proportion of the escaping steam will be condensed in the mass of water, solid fission products carried from the reactor with the second volume of escaping steam will be, for the most part, retained by the water and, by suitable adjustment of the relief means, build-up of pressure within the second containment vessel subsequent to the escape of the initial volume of high pressure steam will be avoided without serious release of radioactive contaminants to the atmosphere and contaminants carried from the reactor by the second volume of relatively low pressure steam will be confined to the second containment vessel.

In accordance with the invention the second containment structure is of elongate form with the pond of water disposed at one end and the relief means disposed at the opposite end.

It is also preferred, if the reactor system is to include a turbine and condenser installation, to make the second containment structure large enough to enclose the installation.

An embodiment of the invention will now be described by way of example, with reference to the drawing accompanying the provisional specification wherein:

FIGURE 1 is a side view, partly in section, and

FIGURE 2 is a full section on the line II—II of FIGURE 1.

The figures show a steam generating nuclear reactor system wherein steam is generated in a nuclear reactor 1 of pressure tube and calandria tank design by heat transfer from nuclear fuel elements contained in one hundred and four of one hundred and twelve pressure tubes 2 to feed water fed to the lower ends of the tubes 2 by circulating pumps 3. The system has a first concrete containment structure 4 spaced from and enclosing the reactor 1, and a turbine hall 5 of elongate form providing a second containment structure spaced from and enclosing the containment 4, a mass of water forming a pond 6 disposed at one end of the space 7 between the containment 4 and turbine hall 5, a venting duct 8 defined by parts 9, 10 of the containment 4 extending from the space 11 defined by the interior of the containment 4 to extend below the surface of the pond 6 and a pressure-sensitive, non-return relief valve 12 of conventional design at the end of the hall 5 remote from the pond 6 and arranged to open at 0.1 p.s.i.g. so as to vent the containment 5 to atmosphere.

In greater detail, the reactor 1 comprises an aluminium calandria tank 13 containing heavy water moderator and defining a lattice of one hundred and twelve calandria tubes each of which locates a pressure tube 2. The one hundred and four tubes 2 fed by the pumps 3 are "boiling" tubes and steam/water mixture is led from take-off pipes 2b at their upper ends to two steam drums 14 where the steam is separated out, a major fraction of the separated-out steam being led to a turbine 15 driving an alternator 16 and a minor fraction being led to the upper ends of the remaining 8 tubes 2.

The 8 tubes 2 are disposed in the centre of the tube lattice and are "superheating" tubes, the minor fraction of steam being superheated in passage over the reactor fuel contained therein. From the lower ends of the "superheating" tube 2 superheated steam is led to and mixed with the major fraction of saturated steam flowing to the turbine 15.

The reactor fuel is in the form of 0.6" dia. $UO_2$ pellets enclosed in tubular sheaths to form fuel rods. The rods are disposed in clusters of thirty-seven. The fuel rods in the "boiling" tubes 2 have zirconium-tin sheaths and the fuel rods in the "superheating" tubes 2 have stainless steel sheaths.

The part 9 of the containment structure 4 comprises a horizontal portion 9a, which forms the charge face of the reactor, and a downwardly extending portion 9b which overhangs and dips into, the pond 6. The portion 9a is spaced sufficiently above the reactor 1 and the portion 9b is spaced sufficiently to the side of the part 10 of the containment 4, to make the duct 8 of substantial size, so that, in the event of a large out-leakage of steam from the reactor 1, pressure build-up within the containment 4 and hence the duct 8 is limited to 5 p.s.i.g. This limitation of pressure build-up enables the containment 4 to be constructed devoid of metallic linings which are usually provided in concrete structures subjected to internal pressures. A lattice of tubes 28 is supported by a grid 29 in the duct 8. The lower ends of the tubes extend below the surface of the water in the pond 6. The pressure tubes 2 have upper extensions 2a which terminate below the snout 17a of a refuelling machine 17 and which are closed-off by removable seal plugs. The containment 4 also serves as a biological shield.

The reactor 1 is refuelled under load by the machine 17 which is mounted in the inner of inner and outer rotatable shields 18, 19 located in the reactor charge face. Irradiated fuel removed from the reactor 1 by the machine 17 is stored, using remote-operated equipment, for a "cooling-off" period in a storage bay 25 at the bottom of the pond 6.

The calandria tank 13 is surrounded by neutron shielding in the form of steel tanks 20 filled with light water.

Under normal operating conditions, the reactor 1 is controlled by variation in level of the heavy water moderator contained in the calandria tank 13 and is shut down in an emergency by dropping shut-off rods into tubes penetrating the tank 13.

In the event of failure of the pumps 3, shut-down decay heat is removed from fuel clusters in the "boiling" tubes 2 by natural circulation and the steam resulting from such circulation is sufficient to remove heat from the fuel clusters in the "superheating" tubes 2 also. Steam flow through the "superheating" tubes 2 is induced by auxiliary condensers 21 disposed above the steam drum 14 and fed with water through line 22 from tanks 23 disposed above the condensers 21. Condensate formed in the condensers 21 is led to the steam drums 14 by lines 24.

Air extraction ducts 26 are connected to fans disposed outside the turbine hall 5. The fans are arranged to start up in the event of a pressure rise in the duct 8 and discharge the withdrawn air to coarse and absolute filters and to charcoal bed apparatus disposed in a closed chamber of large volume from whence it is allowed to be vented through a stack to atmosphere. The capacity of the fans is such that a slight negative pressure can be maintained in the turbine hall 5. A similar extraction system enables non-condensable vapour extracted from the condenser 27 of the turbine 15 to be treated before release to the atmosphere. The turbine hall 5 is constructed so as to retain pressures (for example, 0.1 p.s.i.g.) not exceeding those expected in conventional power house designs. Structures easily fractured by pressure transients, such as windows, are, however, dispensed with.

In the unlikely event of steam escaping from the reactor 1, an initial volume of relatively high pressure steam will discharge into the large size duct 8 where it will immediately lose some of its pressure. The escaping steam forces air present in the duct 8 through the tubes 28 and below the surface of water in the vent. The air escapes in large bubbles to the surface of the water exposed to the turbine hall 5 and most of the steam following the air is condensed in the pond 6. Air and steam escaping from the containment 4 into the turbine hall 5 increases the internal pressure of the turbine hall 5 and causes the relief valve 12 at the far end of the hall to open, allowing first the large volume of air initially present in the hall 5 and then the escaping air and steam mixture to be vented to atmosphere. After the initial escape of relatively high pressure steam from the reactor 1, follows a release of relatively low pressure steam. Because of the loss of their heat transfer medium, the fuel rod clusters present in the reactor are likely to overheat and release radioactive contaminants (for example, fission products) which are then carried out of the reactor 1 and into the duct 8 by the escaping steam. However, as the pressure of this steam is initially somewhat low and as the volume of the turbine hall 5 is large, the internal pressure to which the hall 5 is now subjected is low enough to allow the relief valve 12 to close and prevent the further escape of steam and air to the atmosphere. This reduction in pressure in the turbine hall 5 is assisted by automatic start-up of the fans connected to the extraction ducts 26. Steam/air mixture withdrawn through the ducts 26 is treated by filtering before release to atmosphere of a volume sufficient to ensure a sub-atmospheric pressure in the turbine hall 5. Most of the solid radioactive contaminants are retained in the water of the pond 6.

The large volume of the turbine hall 5 (and also the relative positions of the pond 6 and relief valve 12) ensures that a large mass of air has first to be displaced from the hall 5, followed by further mass of steam/air mixture before any contaminated steam/air mixture arrives at the point of exit from the turbine hall 5 and then at a pressure not high enough to allow escape to the atmosphere.

The invention avoids the need for a costly second or outer containment structure which has to be capable of withstanding relatively high internal pressures and requires only a turbine hall of conventional design capable of withstanding internal pressures of a few inches water gauge.

Further details of the reactor system are as follows:

| | |
|---|---|
| Output | 100 MW(e). |
| Steam pressure at turbine 15 | 900 p.s.i.g. |
| Quality of steam generated in "boiling" tubes 2. | 13% (by weight). |
| Pitch of tubes 2 | 10" (square lattice). |
| Reactor core height (including reflector portions). | 13'. |
| Reactor core diameter | 12'. |
| Upper reflector height | 1'. |
| Lower reflector height | 1'. |
| Fuel enrichment | 2.2% CO. |
| Turbine hall length | 270'. |
| Turbine hall width | 90'. |
| Turbine hall height | 89'. |

What we claim is:

1. A nuclear reactor system of the kind wherein steam at pressure is generated in a nuclear reactor by heat transfer from nuclear fuel to water, the system having a first containment structure spaced from and enclosing the reactor, a second containment structure in the form of an elongate hall spaced from and enclosing the first containment structure, a pond of water disposed at one end of the elongate hall in the space between the first and second containment structures, means defining a venting duct extending from the first containment structure to below the surface of said pond, and pressure-sensitive non-return relief means for venting the second containment structure to atmosphere, said relief means being situated in the second containment structure at the end which is opposed to the one end at which said pond is located, whereby substantially the full length of said elongate hall separates said pond and said relief means.

2. A nuclear reactor system according to claim 1 wherein said elongate hall houses at least one steam turbine for utilizing steam generated within the reactor.

References Cited by the Examiner

UNITED STATES PATENTS

| | | |
|---|---|---|
| 3,115,450 | 12/1963 | Schanz. |
| 3,151,034 | 9/1964 | Douglass et al. |

FOREIGN PATENTS

| | | |
|---|---|---|
| 1,322,444 | 2/1963 | France. |
| 862,624 | 3/1961 | Great Britain. |
| 38-17298 | 9/1963 | Japan. |

OTHER REFERENCES

C&E News, vol. 39, No. 28, July 10, 1961, pages 21 and 22.

Nucleonics I, vol. 21, No. 2, February 1963, pages 17 and 18.

Nucleonics II, vol. 14, No. 3, March 1956, page 35.

References Cited by the Applicant

The Atomic Energy Deskbook, pages 108–109, Hogerton ed., Reinhold Corp., 1963.

CARL D. QUARFORTH, *Primary Examiner.*

L. DEWAYNE RUTLEDGE, LEON D. ROSDOL,
*Examiners.*